United States Patent
Hasegawa

[19]

[11] Patent Number: 5,812,772
[45] Date of Patent: Sep. 22, 1998

[54] MULTI-MEDIA COMMUNICATION SYSTEM AND METHOD THEREFOR

[75] Inventor: Satoshi Hasegawa, Tokyo, Japan

[73] Assignee: NEC Corporation, Tokyo, Japan

[21] Appl. No.: 713,263

[22] Filed: Sep. 12, 1996

[30] Foreign Application Priority Data

Sep. 29, 1995 [JP] Japan .................................. 7-252978

[51] Int. Cl.⁶ .................................................. G11B 17/00
[52] U.S. Cl. ........................... 395/200.32; 381/61; 386/4; 386/7; 386/40; 386/52; 386/68
[58] Field of Search .................. 395/200.33, 200.49, 395/200.32, 200.63; 348/7, 13, 17; 381/61; 386/4, 7, 35, 40, 46, 52, 68

[56] References Cited

U.S. PATENT DOCUMENTS 5,133,079  7/1992  Ballantyne et al. .
5,371,532  12/1994  Gelman et al. .
5,564,001  10/1996  Lewis ........................................ 395/154

FOREIGN PATENT DOCUMENTS 0 633 694 A1  1/1995  European Pat. Off. .
0 653 884 A1  5/1995  European Pat. Off. .
4243057  8/1992  Japan .
4324784  11/1992  Japan .
07250314  9/1995  Japan .

OTHER PUBLICATIONS

European Search Report, dated Mar. 26, 1997.

*Primary Examiner*—Thomas Peeso
*Attorney, Agent, or Firm*—McGinn & Gibb, P.C.

[57] ABSTRACT

A multi-media communication system has a data transmitter and communication terminals. Each communication terminal has a communication interface for communicating with the data transmitter via control signals, and a buffer for storing multi-media data. The control signals include a request for stopping data transmission, a request for restarting data transmission, and a request for transmission of a predetermined amount of data.

20 Claims, 6 Drawing Sheets

MULTI-MEDIA COMMUNICATION SYSTEM AND METHOD THEREFOR

BACKGROUND OF THE INVENTION

The present invention relates to a multi-media communication system, and more particularly to a multi-media communication system having a data transmitter and a communication terminal.

There are many known multi-media communication systems. For one exemplary multi-media communication system, television services called VOD (Video-On-Demand) using communication lines such as cable television (CATV) lines have been developed. Such a conventional multi-media communication system has a head end unit and control terminal units. Each control terminal unit has a display unit connected thereto. The control terminal unit, typically disposed in an individual subscriber's home or office system, sends a control signal requesting a desired program to the head end unit (typically a data transmitter housed in or under the control of a remote broadcast program source). The control signal is sent in response to operation by the subscriber.

In response to the control signal, the head end unit sends the requested program to a predetermined channel in the form of multi-media data, and sends a channel information to the control terminal unit. The control terminal unit selectively receives the program on the channel specified by the channel information, and outputs the program to the subscriber's display unit. Thus, the subscriber can access (e.g., view) the desired program.

The conventional multi-media communication system stores in a separate recording medium an output mode control code for a special effect (e.g., slow-motion play) in addition to picture data and sound data.

This conventional multi-media communication system has a problem such that, since the special effect for the multi-media data on the control terminal units requires that the control code for special effects be separately stored in a recording medium, a medium capacity must be sufficient (e.g., large enough) for storing the control code. Moreover, the head end unit must have a controller for sending data while mutually synchronizing the data according to a request signal from the control terminal unit. As a result, the size of the head end unit is unnecessarily large.

SUMMARY OF THE INVENTION

In view of the foregoing problems of the conventional system, an object of the present invention is to provide a multi-media communication system having various special effects to be performed, without increasing a size of a data transmitter.

In a multi-media communication system according to a first aspect of the present invention, a data transmitter provides a multi-media data. A communication terminal utilizes the multi-media data with a special effect. The communication terminal requests a next multi-media data from the data transmitter according to an amount of multi-media data utilized with the special effect.

With the unique and unobvious structure of the present invention, a multi-media communication system provides various special effects, without increasing the data transmitter size.

BRIEF DESCRIPTION OF THE DRAWINGS

The above-mentioned and other objects, features and advantages of this invention will become more apparent by reference to the following detailed description of the invention taken in conjunction with the accompanying drawings in which.

DETAILED DESCRIPTION OF THE PREFERRED EMBODIMENT

A multi-media communication system in accordance with a preferred embodiment of the present invention will be described in detail with reference to the accompanying drawings.

Figure 1:
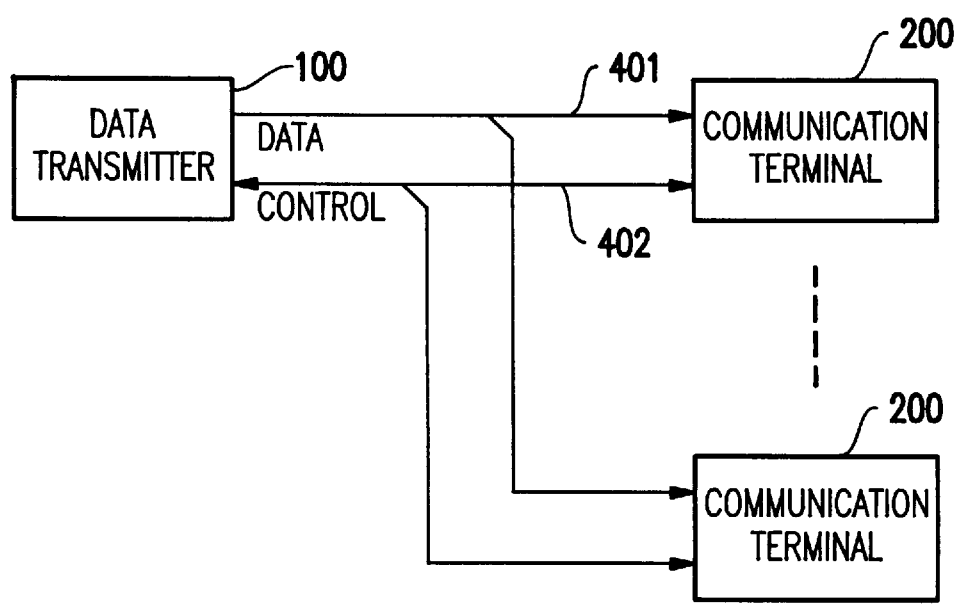
FIG. 1 is a block diagram showing the configuration of a multi-media communication system according to an embodiment of the present invention.

Referring to FIG. 1, a multi-media communication system has a data transmitter 100 and at least one communication terminal 200, and more typically, a plurality of communication terminals 200, for communicating with the data transmitter 100. The data transmitter 100 stores multimedia data, and sends the multi-media data to the communication terminals 200 at the request of the subscriber associated with the respective communication terminal 200. Each communication terminal 200 receives the multi-media data, and displays video and/or sound data accordingly.

Figure 2:
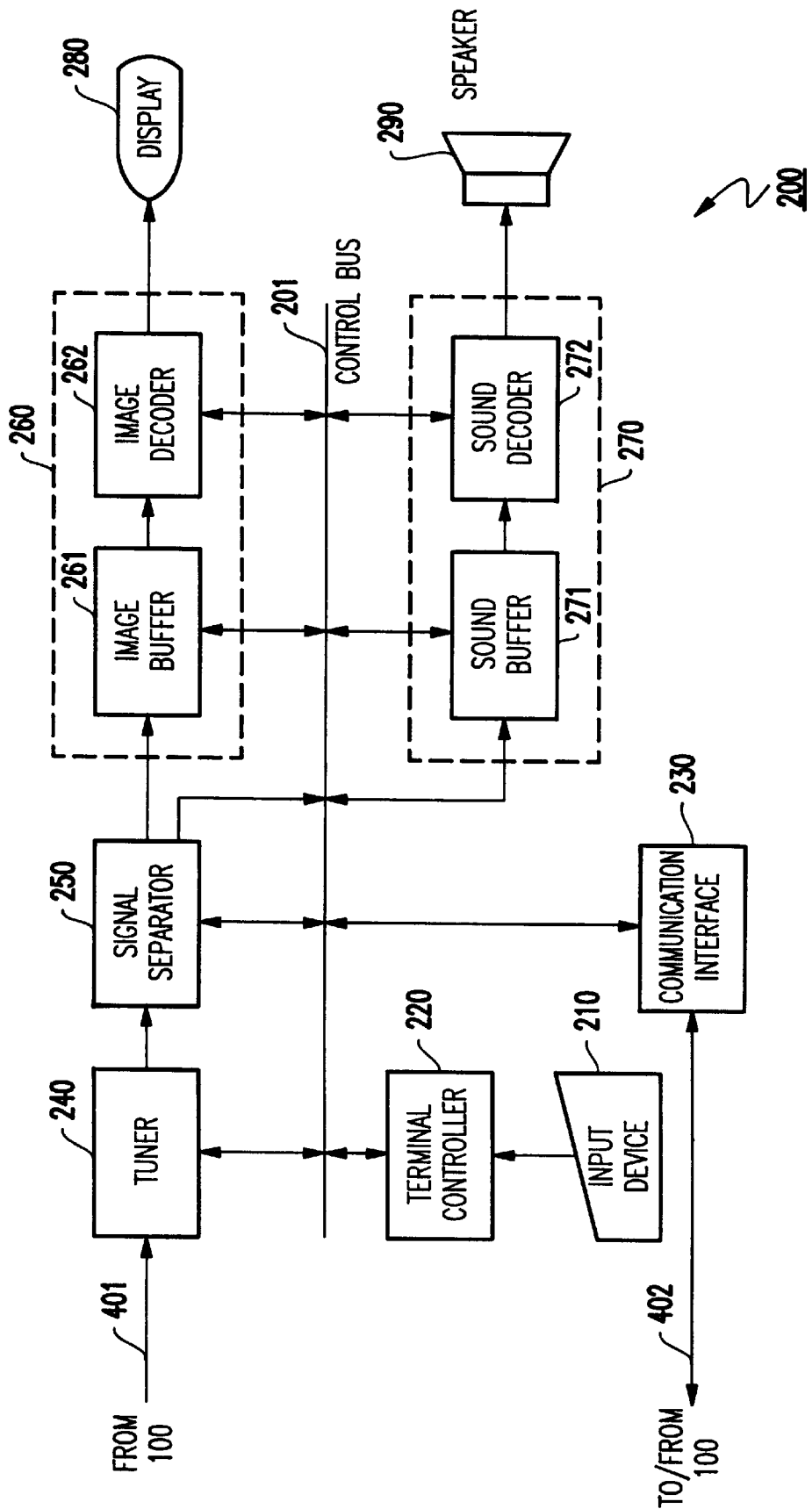
FIG. 2 is a block diagram showing the configuration of a communication terminal 200 used in the multi-media communication system according to the embodiment of the present invention.

Referring to FIG. 2, each of the communication terminals 200 has an input device 210, a terminal controller 220, a communication interface 230, a tuner 240, a signal separator 250, an image processor 260 including an image buffer and an image decoder 262, a sound processor 270 including a sound buffer 271 and a sound decoder 272, a display 280, and an audio output device (speaker) 290. The terminal controller 220, the communication interface 230, the tuner 240, the signal separator 250, the image processor 260, and the sound processor 270 are coupled together by a control bus 201.

The input device 210 (e.g., keyboard, infrared remote controller, touch screen/pad, joy-stick, track ball, voice input, or the like) is used to input instructions from a user (subscriber). The terminal controller 220 receives the instructions from the input device 210, and controls the multi-media communication system via the control bus 201.

The tuner 240 receives multi-media data 401, which may include image and/or sound data, from the data transmitter 100, and selects a predetermined channel of the multi-media data 401. The signal separator 250 separates image data and sound data from the multi-media data 401. The image data are sent to the image processor 260. The sound data are sent to the sound processor 270.

The image processor 260 includes the image buffer 261 and the image decoder 262. The image buffer 261 stores the image data from the signal separator 250. The image decoder 262 decodes the image data stored in the image buffer 261.

The sound processor 270 includes the sound buffer 271 and the sound decoder 272. The sound buffer 271 stores the sound data from the signal separator 250. The sound decoder 272 decodes the sound data stored in the sound buffer 271.

The display 280 displays the image data decoded by the image decoder 262. The speaker 290 amplifies (typically using a variable gain) and outputs the sound data decoded by the sound decoder 272 in a synchronous manner with the image data with synchronization circuitry known in the art.

The communication interface 230 communicates with the data transmitter 100 via a control signal 402. The control signal 402 includes a request for stopping data transmission, a request for restarting data transmission, and a request for transmission of a predetermined amount of data.

Figure 3:
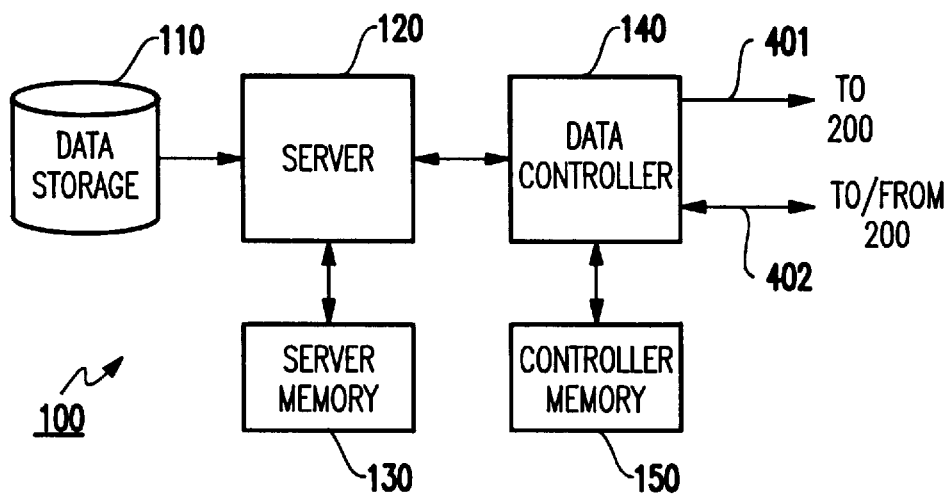
FIG. 3 is a block diagram showing the configuration of a data transmitter 100 used in the multi-media communication system according to the embodiment of the present invention.

Referring to FIG. 3, the data transmitter 100 has a data storage 110, a server 120, a server memory 130, a data controller 140, and a controller memory 150.

The data storage 110 stores multi-media data. The data storage 110 includes a high-capacity auxiliary storage (e.g., an optical disk unit or a magnetic tape for holding video and/or audio data). The server 120 reads out multi-media data from the data storage 110, and holds the read multi-media data in the server memory 130 so that a predetermined amount of multi-media data is held in the server memory 130 to supply the multi-media data for the communication terminal 200 without interruption.

The data controller 140 reads out multi-media data from the server 120, and sends out the multi-media data to the communication terminal 200 via the signal line 401.

Figure 4:
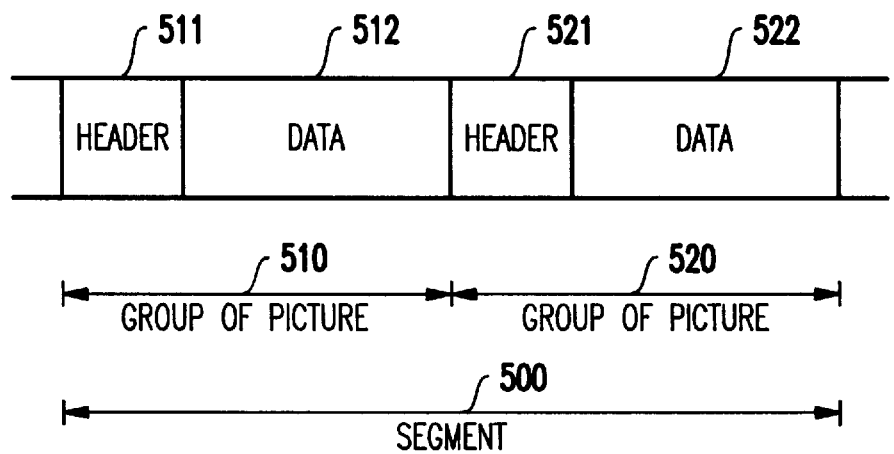
FIG. 4 is an explanatory view showing the configuration of one segment of multi-media data sent by the data transmitter 100.

Referring to FIG. 4, the multi-media data stored in the data storage 110 is formed from a plurality of segments 500. Each segment has at least one Group-Of-Pictures (GOP). In this case, the segment 500 has two GOPs 510 and 520. One GOP 510 has a header field 511 and a data field 512. The data controller 140 recognizes the header fields as boundaries of video and/or audio data.

For example, if one segment 500 is assumed to have 30 pictures, each of data fields 512 and 522 includes 15 pictures. Hence, each of the data fields is assumed to have a number of pictures equal to the other. Thus, if 30 frames are displayed per second during normal playback, then data for one second is stored in one segment and data for 0.5 seconds is stored in each GOP. The multi-media data is sent from the data controller 140 according to this display speed.

Hereinbelow and referring to FIGS. 2, 3, 5, 6, and 7, the operation of the multi-media communication system in accordance with the above-mentioned embodiment of the present invention will be described.

Figure 5:
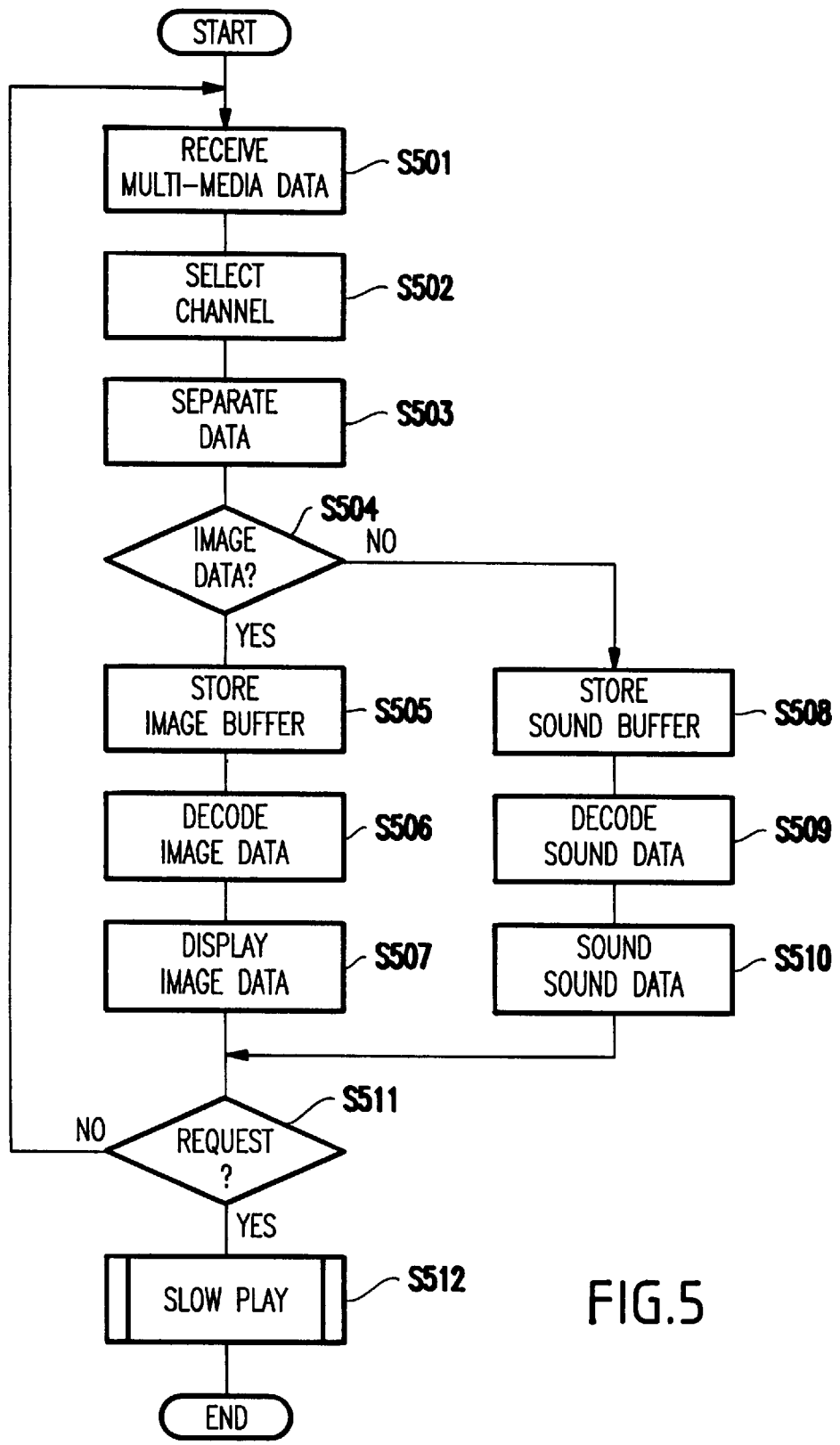
FIG. 5 is a flowchart showing the normal operation in the communication terminal 200.

Referring to FIG. 5, the communication terminal 200 receives multi-media data from the data transmitter 100 via the signal line 401 (step S501). The tuner 240 selects the predetermined channel of the multi-media data on signal line 401 (step S502). The signal separator 250 separates image data and sound data from the multi-media data on signal line 401 (step S503).

If the separated data is image data (step S504), then the separated data is stored in the image buffer 261 (step S505). If the separated data is sound data (step S504), then the separated data is stored in the sound buffer 261 (step S508). The image data in the image buffer 261 is decoded by the image decoder 262 (step S506), and is displayed by the display 280 (step S507). The sound data in the sound buffer 271 is decoded by the sound decoder 272 (step S509), and is amplified and output by the speaker 290 (step S510). As mentioned above, image and sound reproduction are performed in a synchronous manner with known circuitry.

Figure 6:
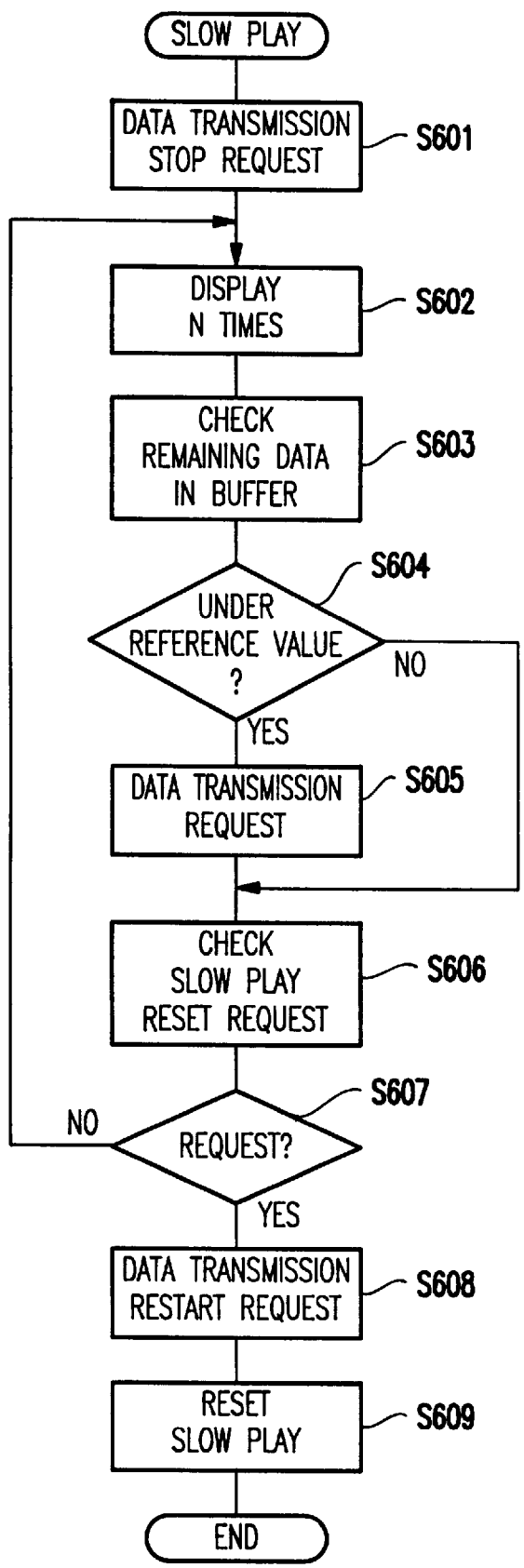
FIG. 6 is a flowchart showing an exemplary special effect (e.g., a slow-motion replay operation) in the communication terminal 200.

If a request for a special effect (e.g., a slow-motion play) is inputted from the input device 210 (step S511), then the communication terminal operates in a slow-motion play mode as illustrated in the flowchart in FIG. 6 (step S512). Otherwise, operations from step S501 are repeated for the remaining multi-media data in the program or broadcast.

Referring to FIG. 6 and the special effect mode (e.g., slow-motion play mode) operation, the terminal controller 220 sends a request for stopping data transmission to the communication interface 230 via the control bus 201. In response to the request, the communication interface 230 sends the control signal 402, indicating the request for stopping the data transmission, to the data transmitter 100 (step S601). This request to stop the data transmission is received by the data transmitter 100, and the output of the multi-media data via the signal line 401 is temporarily stopped according to a process described below.

Specifically, the terminal controller 220 sends a request for slow-motion play to the image decoder 262 via the control bus 201. In response to the request, slow-motion play is performed by the image decoder 262 based on the picture data held in the image buffer 261. In this case, the slow-motion play is carried out by repetitively playing (e.g., outputting) the same frame (picture) "N" (where N is an integer greater than 1) times (step 602).

For example, by repetitively playing the same frame (picture) twice (e.g., N=2), slow-motion play can be performed at ½ of the normal playback speed (e.g., 15 frames per second if the normal playback speed is assumed to be 30 frames per second), and by repetitively playing the same frame (picture) three times (e.g., N=3), slow-motion play can be performed at ⅓ of the normal playback speed (e.g., 10 frames per second if the normal playback speed is assumed to be 30 frames per second).

The image buffer 261 continually checks the amount of the data remaining in the image buffer 261 (step S603). If the remaining data is under the reference value (e.g., (capacity of the image buffer 261)—(1 GOP)), then the image buffer 261 outputs a signal to the communication interface 230 which in turn sends a request for transmission of a predetermined amount of multi-media data to the data transmitter 100 via the control signal line 402 (step S605).

The predetermined amount corresponds to the capacity of the image buffer 261 for holding data which was newly received in response to the request.

The terminal controller 220 checks whether the input device 210 has inputted a request for restarting the data transmission by a user (step S606). If the input device 210 has not inputted the request for restarting the data transmission, then operations from the step S602 are repeated (step S607).

If the input device 210 has inputted the request for restarting the data transmission, then the communication interface 230 sends a request for restarting the data transmission to the data transmitter 100 via the signal line 402 (step S608).

Thereafter, the slow-motion play mode is reset (e.g., terminated) the output of the multi-media data via the signal line 401 at the normal playback speed (e.g., 30 frames per second) is resumed by the data transmitter 100 (step S609).

Next, the operation of the data transmitter 100 is described.

In the normal playback operation, the data controller 140 receives multi-media data from the server 120 on a segment basis according to the normal playback speed on the multi-media communication terminal 200 and holds the multimedia data in the controller memory 150, and sends the multi-media data via the signal line 401.

If the data transmitter 100 receives from communication interface 230 the request for stopping the data transmission via the control signal line 402, the output of the multimedia data via the signal line 401 is stopped immediately after the completion of the unfinished transmission of the GOP.

Figure 7:
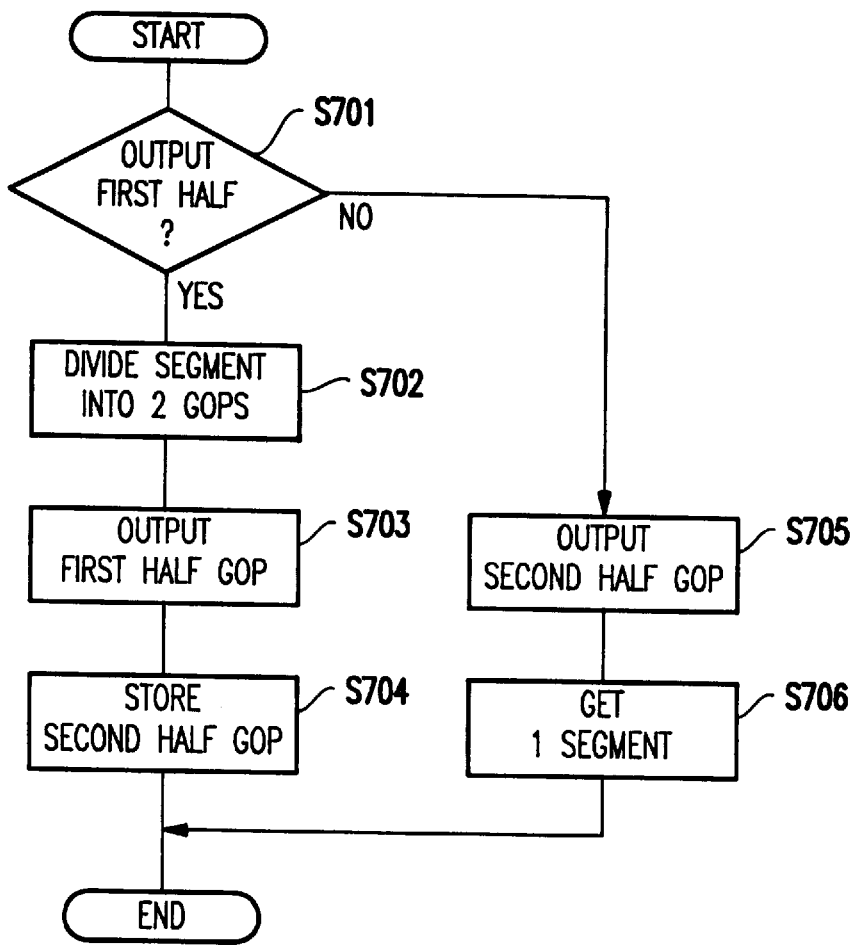
FIG. 7 is a flowchart showing the operation of the data transmitter 100.

If the data transmitter 100 receives the request for data transmission of a predetermined amount via the control signal line 402, the special playback operations in FIG. 7 are started.

Referring to FIG. 7, it is determined whether the preceding transmitted data is a GOP positioned in the second half of a segment (e.g., end of a segment) (step S701). If the preceding transmitted data is the second half GOP, then the data controller 140 divides the segment stored in the controller memory 150 in half according to the header field to produce first and second half-segments (step S702). Thus, each half-segment includes a header field and a data field. The data controller 140 sends the first half-segment to the communication terminal 200 via the signal line 401 (step S703). The data controller 140 stores the second half-segment in the controller memory 150 (step S704).

On the other hand, in step S701, if the preceding transmitted data is the first GOP, then the GOP held in the controller memory 150 is read-out and sent to the communication terminal 200 (step S705). The data controller 140 receives one segment from the server 120 as the next data and stores it in the controller memory 150 (step S706).

Further, if the control signal on signal line 402 from the communication terminal 200 indicates a request for starting the normal transmission, the process returns to the above-described operation for the normal playback.

Although an example has been described in which the image buffer 261 and the sound buffer 271 in the communication terminal 200 have a storage capacity for holding multi-media data for one to two GOPs, the present invention is not limited to this configuration.

For example, it may be configured such that, in response to a request for sending a predetermined amount of data from the communication terminal 200, a plurality of GOPs are sent from the data controller 140 corresponding to the amount of data that can be held in the image buffer 261 in the communication terminal 200.

As is apparent from the above description, according to the present invention, since the communication interface 230 requests the control of the data transmission from the data transmitter 100, the medium (or its size and capacity) for storing control codes for special effects is not required. Thus, the data transmitter size does not increase.

Although slow-motion playback has been described above, this special effect is but one exemplary special effect, and the present invention is not limited to this specific special effect. Indeed, the present invention can be equally applied to any special effects presently known in the industry. For example, by making the playback speed slower, a frame advance play or pause may be performed, and by reversing the playback sequence of image data, a reverse play or reverse slow-motion play may be performed.

Likewise, fast-motion advance play or reverse play may be performed. Further, by using the image data within the image buffer 261 to perform a playback with a timing or sequence different from the normal playback, various special effects are possible.

In addition, similar special effects for playback can be performed for not only image data but also for sound data.

While the invention has been described in terms of a preferred embodiment, those skilled in the art will recognize that the invention can be practiced with modification within the spirit and scope of the appended claims.

What is claimed is:

1. A multi-media communication system, comprising:
   a data transmitter for providing a multi-media data; and
   a communication terminal for selectively utilizing the multi-media data with a slow-motion playback, wherein said communication terminal requests a next multi-media data from said data transmitter according to an amount of the multimedia data with the slow-motion playback having been utilized.

2. The multi-media communication system according to claim 1, said communication terminal comprising:
   a multi-media data processor for storing and decoding the multi-media data; and
   a communication interface for requesting the next multi-media data from said data transmitter.

3. The multi-media communication system according to claim 2, said multi-media data processor comprising:
   a multi-media data buffer for storing the multi-media data; and
   a multi-media data decoder for decoding the multi-media data stored in said multi-media data buffer.

4. A multi-media communication system
   a data transmitter for providing a multi-media data; and
   a communication terminal for selectively utilizing the multi-media data with a special effect, wherein said communication terminal requests a next multi-media data from said data transmitter according to an amount of the multi-media data with the special effect having been utilized, said communication terminal comprising:
   a multi-media data processor for storing and decoding the multi-media data; and
   a communication interface for requesting the next multi-media data from said data transmitter, said multi-media data processor comprising:
   a multi-media data buffer for storing the multi-media data; and
   a multi-media data decoder for decoding the multi-media data stored in said multi-media data buffer,
   wherein said multi-media data buffer informs said communication interface of an amount of the multi-media data remaining in said multi-media data buffer to be utilized, and
   wherein said communication interface requests the next multi-media data from said data transmitter according to the amount of the image data in said multi-media data buffer.

5. The multi-media communication system according to claim 4, said communication terminal further comprising:
   an input device for inputting to said multi-media data processor a request for the special effect.

6. The multi-media communication system according to claim 4, said communication terminal further comprising:

a tuner for selecting a predetermined channel of the multi-media data for said multi-media data processor.

7. A multi-media communication system comprising:

a data transmitter for providing a multi-media data; and a communication terminal for selectively utilizing the multi-media data with a special effects wherein said communication terminal requests a next multi-media data from said data transmitter according to an amount of the multi7 media data with the special effect having been utilized, said communication terminal comprising:

a multi-media data processor for storing and decoding the multi10 media data; and a communication interface for requesting the next multi-media data from said data transmitter;

a signal separator for separating the multi-media data into an image data and a sound data, and said multi-media data processor comprising:

an image processor for processing the image data; and a sound processor for processing the sound data.

8. The multi-media communication system according to claim 7, said image processor comprising:

an image buffer for storing the image data; and an image decoder for decoding the image data stored in said image buffer, wherein said image buffer informs said communication interface of an amount of the image data remaining in the image buffer to be decoded, and wherein said communication interface requests the next multi-media data from said data transmitter according to the amount of the image data remaining in said image buffer.

9. The multi-media communication system according to claim 7, said sound processor comprising:

a sound buffer for storing the sound data; and a sound decoder for decoding the sound data stored in said sound buffer, wherein said sound buffer informs said communication interface of an amount of the sound data remaining in said sound buffer to be decoded, and wherein said communication interface requests the next multi-media data from said data transmitter according to the amount of the sound data remaining in said sound buffer.

10. A multi-media communication system, comprising:

a data transmitter for providing a multi-media data; and a communication terminal for selectively utilizing the multi-media data with a special effect, wherein said communication terminal requests a next multi-media data from said data transmitter according to an amount of the multi-media data with the special effect having been utilized, said data transmitter comprising:

a data storage for storing the multi-media data; and a data controller for sending the multi-media data to said communication terminal.

11. The multi-media communication system according to claim 10, wherein the multi-media data includes at least one segment, said at least one segment comprising at least one group of pictures, and wherein said data controller divides said at least one segment into first and second group-of-pictures portions.

12. A communication terminal for utilizing a multi-media data with a slow-motion playback, comprising:

a multi-media data processor for storing and decoding the multi-media data; and a communication interface for requesting a next multi-media data according to an amount of the multi-media data having been utilized with the slow-motion playback by said communication terminal.

13. The communication terminal according to claim 12, said multi-media data processor comprising:

a multi-media data buffer for storing the multi-media data; and a multi-media data decoder for decoding the multi-media data stored in said multi-media data buffer.

14. A communication terminal for utilizing a multi-media data with a special effect, comprising:

a multi-media data processor for storing and decoding the multi-media data; and a communication interface for requesting a next multi-media data according to an amount of the multi-media data having been utilized with the special effect by said communication terminal, said multi-media data processor comprising:

a multi-media data buffer for storing the multi-media data; and a multi-media data decoder for decoding the multi-media data stored in said multi-media data buffer, wherein said multi-media data buffer informs said communication interface of an amount of the multi-media data remaining in said multi-media buffer to be utilized, and wherein said communication interface requests the next multi-media data according to the amount of said multi-media data remaining in said multi-media data buffer.

15. The communication terminal according to claim 14, further comprising:

an input device for inputting a request for the special effect to said multi-media data processor; and a tuner for selecting a predetermined channel of the multi-media data for said multi-media data processor.

16. A communication terminal for utilizing a multi-media data with a special effect, comprising:

a multi-media data processor for storing and decoding the multi-media data;

a communication interface for requesting a next multi-media data according to an amount of the multi-media data having been utilized with the special effect by said communication terminal; and a signal separator for separating the multi-media data into an image data and a sound data, and said multi-media data processor comprising:

an image processor for processing the image data; and a sound processor for processing the sound data.

17. A data transmitter, comprising:

a data storage for storing a multi-media data; and a data controller for outputting the multi-media data, wherein the multi-media data includes at least one segment, said at least one segment including at least one group of pictures, and wherein said data controller divides said at least one segment into first and second group-of-pictures portions.

18. A method for utilizing a multi-media data in a communication terminal having a buffer, said method comprising steps of:

requesting termination of a transmission of the multi-media data;

processing the multi-media data with a special effect;

judging whether an amount of said multi-media data remaining in said buffer to be processed is less than a reference value; and based on said judging step, requesting transmission of a predetermined amount of a multi-media data, if the amount of said multi-media data remaining in said buffer to be processed is less than the reference value.

19. The method for utilizing the multi-media data in the communication terminal according to claim 18, said processing step comprising a step of:

playing a same picture of an image data in the multi-media data a plurality of times.

20. A method for transmitting a multi-media data by a data transmitter, said method comprising steps of:

dividing a segment of the multi-media data into a plurality of groups of pictures;

outputting a first group of pictures;

storing remaining ones of said groups of pictures; and outputting a second group of pictures of said remaining ones of said groups of pictures.

* * * * *